United States Patent [19]

Charbonnier et al.

[11] Patent Number: 4,752,480

[45] Date of Patent: Jun. 21, 1988

[54] PROCESS AND COMPOSITION FOR ATTRACTING AND RETAINING FISH

[75] Inventors: Jean-Paul Charbonnier; Bernard De Passemar, both of Paris, France

[73] Assignee: Groupement d'Etudes et de Recherches Navales (G.E.R.N.), France

[21] Appl. No.: 914,330

[22] Filed: Oct. 2, 1986

[30] Foreign Application Priority Data

Oct. 3, 1985 [FR] France ................. 85 14674

[51] Int. Cl.$^4$ ..................... A01K 85/00; A23K 1/18
[52] U.S. Cl. ........................ 426/1; 426/805
[58] Field of Search .............. 426/1, 805, 656

[56] References Cited

U.S. PATENT DOCUMENTS 2,434,220  1/1948  Muir et al. ............... 426/1

FOREIGN PATENT DOCUMENTS 251218   4/1963  Australia ................ 426/1
59-118050 7/1984  Japan ................... 426/1

OTHER PUBLICATIONS

Harada et al., Bulletin of the Japanese Society of Scientific Fisheries, 1984, 50 (4), pp. 617–622.

Mackie, Dev. Aquacult. Fish Sci., vol. 8, 1982, pp. 275–291.
Chemical Abstract, vol. 101, p. 3, Jul. 1984, p. 512, No. 22392K.

Primary Examiner—George Yeung
Attorney, Agent, or Firm—Jones, Day, Reavis & Pogue

[57] ABSTRACT

The invention relates to a composition for attracting and retaining fish in an area of an aquatic medium. This composition comprises an active mixture constituted by at least one active element chosen from among monoalkylamines, dialkylamines, trialkylamines, polyamines and the oxides thereof, e.g. monomethylamines, dimethylamines and trimethylamines; at least one active element chosen from among the amino acids and amides, e.g. lysine and/or urea; optionally ammonia; and optionally an active element chosen from among hydrochloric, hydrobromic, hydroiodic, sulphuric, phosphoric, formic, myristic, lactic, butyric, acetic and caproic acids, provided that the mixture contains ammonia when the element of the first group is a trialkylamine. These compositions can be used in the form of solutions, dispersions, granules, powders, etc in different fishing techniques. It is also possible to include these compositions on appropriate adsorbing or absorbing supports.

21 Claims, No Drawings

PROCESS AND COMPOSITION FOR ATTRACTING AND RETAINING FISH

BACKGROUND OF THE INVENTION

The present invention relates to a process and a composition for attracting and retaining fish.

It more specifically relates to compositions usable for fishing making it possible to attract and retain fish in an area of an aquatic medium by recreating in said area olfactory and/or gustatory traces to which the fish are sensitive. It is pointed out that within the present context the term fish is understood to mean any animal living in salt, brackish or fresh water, which includes cetaceans, molluscs, crustaceons, etc.

Since time immemorial, certain fishermen have used various processes for attracting and/or retaining fish in order to more easily capture them with various known means (such as nets, draw nets, trawls, harpoons, fishing hooks, eel pots, etc). These processes can make use of visual, luminous, acoustic and/or vibratory lures, or baits prepared from synthetic and/or natural materials and which are used to give the impression that food is available.

Of late, synthetic bait methods have been developed by attempting to reconstitute in an artificial manner the flesh of fish normally serving as prey for the fish which are of interest to fishermen. With this aim in mind, studies have recently been carried out by A. D. F. JOHNSTONE and A. M. MACKIE concerning the possibility of using as bait products based on casein, to which is added a synthetic squid preparation. The research carried out up to now has only been in the laboratory stage and has more particularly related to the behaviour of fish with respect to such food offered to them in the aquarium. The synthetic squid preparation used was prepared on the basis of analyses performed on squid tissues. This preparation comprises numerous constituents, namely 17 different acids, betaine, betaine hydrochloride, trimethylamine oxide hydrochloride, trimethylamine hydrochloride, hypoxanthine, inosine, adenosine monophosphate and lactic acid. Laboratory tests carried out on the cod made it possible to show that the presence of a lipidic fraction in such food for fish was not essential because cod consumed the same amount of fish with or without lipids (cf the papers by A. D. F. JOHNSTONE and A. M. MACKIE entitled "Investigations of bait acceptance by the Cod, Gadus morhua L", read at the Bergen conference between May 28th and May 31st 1985).

Such compositions suffer from the disadvantage of having a large number of constituents. Moreover, as the authors indicate, the effectiveness of these compositions in the sea still has to be investigated, because it is not certain that they will be able attract fish possibly at a depth of several tens or hundreds of meters. Moreover, their stability in time is uncertain.

For some time now and as indicated in French Pat. No. 582 224, it is known that ammonia and turpentine have an attracting capacity for fish. However, although such compounds have an action on the fish, they do not make it possible to effectively attract and retain them.

In addition, up to now, there has been no composition making it possible to sufficiently effectively ensure the grouping of fish in an area of the aquatic medium where they can then easily be caught.

SUMMARY OF THE INVENTION

The present invention relates to a process and a composition for attracting and retaining fish having a good effectiveness at several hundred meters and which has the advantage of only having a few constituents, whilst being easy to produce and which can be easily kept.

The present invention therefore relates to a composition for attracting and retaining fish in an area of an aquatic medium, wherein it comprises active mixtures constituted by at least one active element chosen from a first group comprising monoalkylamines, dialkylamines, trialkylamines, polyamines and their oxides; at least one active element chosen from a second group comprising the amino acids, urea and amides of formula R—CO—NH$_2$, in which R represents a hydrogen atom, an alkyl radical or the radical CH$_3$—CHOH; optionally ammonia; and optionally at least one active element chosen from among a third group comprising hydrochloric, hydrobromic, hydroiodic, sulphuric, phosphoric, formic, myristic, lactic, butyric, acetic and caproic acids; whereby the element of the third group and/or the amino acids of the second group can at least partly be combined with ammonia in the form of ammonium salt and the hydrochloric, hydrobromic, hydroiodic, sulphuric and phosphoric acids of the third group can be combined at least partly with the amines and/or amino acids and can therefore be present in the active mixture in the form of hydrochloride, hydrobromide, hydroiodide, sulphate and/or phosphate of amine or amino acid; the active mixture including ammonia when the element of the first group is a trialkylamine, the active element incorporating at least one active element of the third group when the active element of the second group is an amino acid, the active element or elements belonging to the first group representing at least 5 molar % of the active mixture, the active element or elements belonging to the second group representing at least 5 molar % of the active mixture and the ammonia representing at the most 80 molar % of the active mixture.

The present invention also relates to a process for attracting and retaining fish in an area of an aquatic medium, wherein it comprises diffusing into said area at least one active element chosen from a first group including monoalkylamines, dialkylamines, trialkylamines, polyamines and their oxides; at least one active element chosen from a second group including amino acids, urea and amides of formula R—CO—NH$_2$, in which R represents a hydrogen atom, an alkyl radical or the radical CH$_3$—CHOH—; optionally ammonia; and optionally at least one active element chosen from a third group comprising hydrochloric, hydrobromic, hydroiodic, sulphuric, phosphoric, formic, myristic, lactic, butyric, acetic and caproic acids; the element of the third group and/or the amino acids of the second group being diffusible in combination with the ammonia in the form of ammonium salt, the hydrochloric, hydrobromic, hydroiodic, sulphuric and phosphoric acids of the third group being diffusible in combination which the amines and/or amino acids in the form of hydrochloride, hydrobromide, hydroiodide, sulphate and/or phosphate of amine or amino acid; provided that ammonia is diffused into the aquatic medium when the element or elements of the first group are trialkylamines, that an active element of the third group is diffused into the aquatic element of the second group is an amino acid and that the proportion of active elements of the first group and the proportion of active elements of the second group diffused into the aquatic medium represent at least 5 molar % of the total of the diffused active elements, including the ammonia.

In the composition and process according to the invention, the two essential elements for attracting and retaining fish are constituted on the one hand by an amine and on the other by an amide and/or an amino acid. However, when the amine used is a trialkylamine, it is essential that the active mixture also contains ammonia, because the trialkylamines alone have no significant action on fish.

However, when the element of the second group is a monoalkylamine and/or dialkylamine, there is no need to associate them with ammonia to obtain satisfactory results. Thus, monoalkylamines and dialkylamines very significantly attract carnivorous fish, such as tunny and sea perch, the action being greatest with monoalkylamines.

The presence of the two elements of the first and second groups is adequate to obtain a good effectiveness of the composition. However, preference is generally given to the addition to the active mixture of a third acid constituent making it possible to adjust the pH of the active mixture to the desired value, e.g. in the case of hydrochloric, hydrobromic, hydroiodic, sulphuric and/or phosphoric acids and/or even further attract fish in the case of formic, myristic, lactic, butyric, acetic and caproic acids.

When the added acid is hydrochloric, hydrobromic, hydroiodic, sulphuric or phosphoric acid, it is possible to introduce same into the active mixture combined with ammonia, e.g. in the form of ammonium chloride, or combined with the amine or amino acid, e.g. in the form of the hydrochloride of the amine or amino acid. In the same way, the other acids can be introduced into the mixture in the form of the corresponding ammonium salt.

As has been shown hereinbefore, the active elements of the first and second groups must be present in the active mixture in a quantity such that the total of the active elements of the first group represents at least 5 molar % of the mixture and the total of the active elements of the second group represents at least 5 molar % of the mixture. Preferably, the total quantity of active elements of the first or second groups does not exceed 80 molar % of the mixture.

When the active mixture includes ammonia, the latter is generally present in a quantity such that the molar ratio of amine to ammonia is in the range 0.06 to 4. Moreover, it is preferable for the ammonia quantity not to exceed 80 molar % of the active mixture and preferably 30 molar % of the active mixture.

When the active mixture contains an element of the third group, such as hydrochloric, hydrobromic, hydroiodic, sulphuric and phosphoric acids, same is generally added in a quantity such that the pH of the active mixture is adjusted to the desired value, which is preferably that of the aquatic medium for which the mixture is intended in order to facilitate the handling problems of the mixture and introduce into the aquatic medium a mixture having characteristics close thereto. When the aquatic medium is ocean water, the pH is adjusted to values of approximately 7 to 8.5, which are generally those of ocean water.

When the active mixture comprises an active element of the third group such as formic, myristic, lactic, butyric, acetic or caproic acids, same is generally present in a quantity such that it represents 5 to 50 molar % of the mixture. Preferably said mixture is lactic acid and it is generally introduced in equimolar mixture with the amine.

The composition for attracting and retaining fish can also contain, besides the active mixture, other substances which can be used as a support or solvent. It can also include other additives, particularly known for their capacity to attract and/or retain fish, such as e.g. hormones, vitamins and agents increasing the craving of fish, such as anise and turpentine. These additives can in particular be chosen as a function of the sought fish.

The amines which can be used as the active element in mixture according to the invention are monoalkylamines, dialkylamines, trialkylamines, polyamines and their oxides, which have an adequate solubility in water, namely a solubility of at least 0.01 mole of amine or amine oxide per liter of water at the temperature of the aquatic medium for which the mixture is intended. Examples of such amines are monomethylamine, dimethylamine, trimethylamine, triethylamine, primary, secondary and tertiary propylamines, primary, secondary and tertiary butylamines, primary, secondary and tertiary pentylamines, hexamethylene diamine, hexamethylene tetramine and triethylene glycol tetramine.

The amino acids which can be used in the active mixture according to the invention are amino acids which are sufficiently soluble in water, e.g. having a solubility of at least 0.01 mole per liter of water at the temperature of the aquatic medium. Use is preferably made of amino acids corresponding to the degradation products of the tissues of marine fauna, e.g. those left in trace state in the aquatic medium by living or dead fish. Examples of such amino acids are tryptophan, lysine, arginine or proline. These amino acids can be combined with one another or with other amino acids for introduction into the active medium. It is also possible to introduce the arginine in the form of arginine glutamate.

The amides of formula $R-CO-NH_2$ which can be used as active elements of the second group in the active mixture according to the invention are also water-soluble amides, e.g. having a solubility of at least 20 g/l. Examples of such amides are formamide, lactamide, butyramide and amides of myristic and caproic acids. Preferably, use is made of urea as the active element of the second group, because it is very soluble in water.

The compositions according to the invention can be used in the form of solutions, dispersions, granules, powders or colloidal solutions. They can also be included on or in various solid supports inert with respect to fish.

In the case of solutions, it is possible to dissolve the active mixture in water and preferably in the aquatic medium for which the composition is intended, generally in ocean water. In the case of dispersions or colloidal solutions, it is possible to use conventional products, e.g. gelatin for producing such solutions.

When using the active mixture according to the invention in the form of a solid product, it is possible to prepare said product e.g. from granules or pellets, by compressing different constituents in the solid state after optionally adding binders and/or excipients thereto. It is also possible to coat the different constituents of the mixture in a soluble product or which disintegrates in water.

The compositions according to the invention can also be in the form of an absorbing or adsorbing support containing the active mixture. The latter can be introduced into the support from a solution in water. It is also possible to use for said introduction purposes a solution of the active mixture in an organic product which is not very soluble in water, such as oil, fish oil, paraffin, cod liver oil, turpentine oil, vaseline, etc so as to then obtain a slow diffusion of the active mixture into the aquatic medium.

It is also possible to use water-dispersable or water swellable supports, such as alumina. When using solid adsorbing or absorbing supports, the degree of desorption of the active mixture in the aquatic medium can be regulated by appropriately choosing the characteristics of the support.

Moreover, it is possible to choose solid supports having an appropriate density, e.g. a density well above 1, in order to disperse the active mixture according to the invention at an adequate depth. Thus, by e.g. choosing a powder support of an appropriate density, the active mixture can be dispersed in a large area of the aquatic medium without using large quantities of active products.

Finally, the use of solid supports also makes it possible to separately diffuse in the aquatic medium the various active elements of the mixture. In this case, it is possible to use a system containing several adsorbing or or absorbing supports, on each of which is fixed at least one constituent chosen from among ammonia and the active elements of the first, second and third groups, said supports having characteristics such that the diffusion rate of the active elements and the ammonia in the aquatic medium from said supports corresponds to the diffusion of a mixture in which the concentrations of active elements of the first and second groups each represent at least 5 molar % of the diffused mixture.

In this case, each support may only contain a single active element of the mixture, but it is also possible to use supports containing several active elements, provided that their characteristics are chosen so as to obtain the diffusion of desired active element levels in the aquatic medium.

It is also possible to use plastic solid supports, e.g. adhesive supports making it possible to introduce the active mixture according to the invention around a fishing hook, or open porosity plastic foam supports, e.g. of polyurethane foam, which can also be in the form of lures.

The active mixture support according to the invention can also be constituted by materials such as leather, fabrics, etc. Such supports can be impregnated with the active mixture according to the invention by immersing them in cod liver oil emulsions containing the active mixture.

DETAILED DESCRIPTION OF PREFERRED EMBODIMENTS

Other features and advantages of the invention can be gathered from the following non-limitative description of embodiments.

In these examples, different compositions were prepared containing the active mixture according to the invention and their effectiveness for attracting and retaining fish in the ocean were tested. In all the examples, the compositions are obtained by dissolving the different elements of the active mixture in 8 liters of ocean water. The molar quantities of the active elements used for each example are indicated in the attached table.

In this table, examples 6 to 18 and 20 to 34 relate to the compositions according to the invention and examples 1 to 5 and 19 are given for comparison purposes and illustrate the results obtained with the compositions not entering in the scope of the invention.

In each example, the solution prepared by dissolving the different active elements in 8 liters of ocean water is introduced into floating reservoirs, which are provided with rigid end fittings issuing into the ocean water at a depth of approximately 80 cm. After detecting a relatively large fish shoal, three reservoirs of this type are positioned 100 meters from one another and at a distance of 100 to 200 meters from the fish shoal, so that the current on the buoys associated with the reservoirs reaches the immediate vicinity of the fish shoal. The buoys are not located on the same current line, so that the emissions of the reservoirs do not mix before reaching the fish shoal. Obviously, a check is made before hand to establish the absence of fish in the vicinity of the floating reservoirs and buoys.

After installing these reservoirs, the solution contained in each of them is introduced into the ocean water at a substantially constant flow rate (approximately 0.13 to 0.26 l/min), then the presence of absence of fish in the immediate vicinity of each of the reservoirs is detected by using a boat passing from one to the other and a recording sounder of the CRM SKIPER 417 type, which emits at 50 kHz within a cone aperture of 25°. This apparatus is extremely sensitive and make it possible to very easily detect the fish and evaluate both the size thereof and the extent of their concentration.

The results obtained with each of the compositions are given in the attached table, where − indicates a negative result and + a positive result, which can range from 1+ to 5+, the latter representing the maximum of fish attracted and retained.

It is apparent from these results that the compositions of examples 1 to 5 not containing the active element of the second group were unable to give a satisfactory result and this also applies to example 19, where trimethylamine was used alone without being associated with ammonia. However, composition 6 to 18 based on ammonia, amine, lactic acid, lysine and/or urea gave good results. In the same way, compositions 20 to 34 gave satisfactory results.

Thus, it can be seen that the replacement of ammonia by ammonium chloride does not modify the effectiveness of the composition.

This enables the assumption to be made that it is the ions rather than the molecules, which have the major influence on the gustatory sense of the fish. Thus, in the marine medium, the active elements are in a virtually infinite aqueous solution in the presence of a significant sodium chloride quantity and their ionization is virtually total. This is why the active elements can be introduced in the form of salts, hydrochlorides, hydrobromides, hydroiodides, phosphates and/or sulphates.

Thus, the compositions according to the invention have a very good effectiveness and they can be used for fishing by associating them with appropriate capturing instruments, e.g. for fishing with square dipping nets, trawls, drag nets, fishing hooks and nets.

In the case of square dipping net fishing, it is possible to position the compositions in the vicinity of the net by using bottles having openings making it possible to diffuse the composition into the ocean water at an appropriate flow rate after anchoring the boat. When the attracted fish shoal is adequate, the net is then raised.

In the case of fishing with bow nets, the composition according to the invention is placed in a reservoir fixed in the net and the diffusion flow rate is regulated to a very low value.

In the case of trawl fishing, use is made of conventional lures constituted by flexible rubber tubes, which are filled with compositions according to the invention by sealing them with a membrane made from a material able to slowly diffuse the composition. It is also possible to use impregnated leather fragments and this brings about good results.

When fishing with the aid of ordinary nets, the latter are placed around a buoy provided with a reservoir containing the active mixture according to the invention, which is thus introduced into the ocean water at an appropriate flow rate in the vicinity of the nets.

Thus, the compositions according to the invention are very interesting, because they are effective, easy to produce and usable with different fishing methods.

gen atom, an alkyl radical or a $CH_3$—CHOH radical; and ammonia; said element from said first group representing at least 5 molar percent of the active mixture, said element from said second group representing at least 5 molar percent of the active mixture, and the ammonia representing at most 80 molar percent of the active mixture.

3. A composition for attracting and retaining fish in an area of an aquatic medium, which comprises an active mixture comprising at least one active element selected from a first group consisting of monoalkylamines, dialkylamines, polyamines and their oxides; at least one active element selected from a second group consisting of amino acids, urea and amides having a formula R—CO—$NH_2$, in which R represents a hydrogen atom, an alkyl radical or a $CH_3$—CHOH radical; and at least one active element selected from a third

TABLE

| EXAMPLES | 1 | 2 | 3 | 4 | 5 | 6 | 7 | 8 | 9 | 10 | 11 | 12 | 13 |
|---|---|---|---|---|---|---|---|---|---|---|---|---|---|
| AMMONIA | 6 | 6 | 6 | 3 |   | 6 | 6 | 6 | 3 | 6 | 6 | 3 |   |
| MONOMETHYLAMINE |   |   | 6 |   | 3 |   |   | 6 |   |   | 6 |   | 6 |
| DIMETHYLAMINE |   | 6 |   | 6 |   |   | 6 |   | 6 |   |   | 6 |   |
| TRIMETHALAMINE | 6 |   |   |   | 3 | 6 |   |   |   | 6 |   |   | 3 |
| TRIETHYLAMINE |   |   |   |   |   |   |   |   |   |   |   |   |   |
| LACTIC ACID | 6 | 6 | 6 | 6 | 6 | 6 | 6 | 6 | 6 | 6 | 6 | 6 | 6 |
| LYSINE |   |   |   |   |   | 4 | 4 | 4 | 4 |   |   |   |   |
| UREA |   |   |   |   |   |   |   |   |   | 6 | 6 | 6 | 6 |
| RESULTS | − | − | − | − | − | +++ | ++ | ++++ | +++ | +++ | ++++ | ++++ | ++++ |

| EXAMPLES | 14 | 15 | 16 | 17 | 18 | 19 | 20 | 21 | 22 | 23 | 24 |
|---|---|---|---|---|---|---|---|---|---|---|---|
| AMMONIA | 6 | 6 | 6 | 6 | 3 |   | 6 | 6 | 6 |   |   |
| MONOMETHYLAMINE | 6 |   |   |   | 6 |   | 6 |   |   | 3 | 3 |
| DIMETHYLAMINE |   | 6 |   |   |   | 6 |   | 3 |   |   | 3 |
| TRIMETHYLAMINE |   |   |   | 6 |   |   |   |   | 6 |   |   |
| TRIETHYLAMINE |   |   |   |   |   | 3 |   |   |   | 3 |   |
| LACTIC ACID | 6 |   | 6 | 6 | 6 | 6 |   |   |   |   |   |
| LYSINE |   | 2 | 2 | 2 | 2 | 2 |   |   |   |   |   |
| UREA | 3 | 3 | 3 | 3 | 3 | 3 | 6 | 6 | 6 | 6 | 6 |
| RESULTS | ++++ | +++++ | ++++ | ++++ | ++++ | − | +++ | + | ++ | ++ | ++ |

| EXAMPLES | 25 | 26 | 27 | 28 | 29 | 30 | 31 | 32 | 33 | 34 |
|---|---|---|---|---|---|---|---|---|---|---|
| AMMONIA | 6 | 6 | 6 | 6 | 6 | 6 | 6 | 6 | 6 | 6 |
| MONOMETHYLAMINE | 3 |   |   | 6 |   |   |   |   |   |   |
| DIMETHYLAMINE |   | 3 |   |   | 6 |   | 6 |   |   |   |
| TRIMETHYLAMINE |   |   | 6 |   |   | 6 |   |   |   |   |
| TRIETHYLAMINE |   |   |   |   |   |   |   | 6 | 6 | 6 |
| LACTIC ACID |   |   |   |   |   |   | 6 |   |   |   |
| LYSINE |   |   |   | 6 | 6 | 6 |   | 6 |   | 6 |
| UREA | 6 | 6 | 6 | 6 | 6 | 6 | 6 | 6 | 6 | 6 |
| RESULTS | +++ | ++ | ++++ | ++ | +++ | ++ | +++++ | ++++ | +++ | ++++ |

What is claimed is:

1. A composition for attracting and retaining fish in an area of an aquatic medium, which comprises an active mixture comprising at least one active element selected from a first group consisting of monoalkylamines, dialkylamines, polyamines and their oxides; and at least one active element selected from a second group consisting of urea and amides having a formula R—CO—$NH_2$, in which R represents a hydrogen atom, an alkyl radical or a $CH_3$—CHOH radical; said element from said first group representing at least 5 molar percent of the active mixture, and said element from said second group representing at least 5 molar percent of the active mixture.

2. A composition for attracting and retaining fish in an area of an aquatic medium, which comprises an active mixture comprising at least one active element selected from a first group consisting of monoalkylamines, dialkylamines, trialkylamines, polyamines and their oxides; at least one active element selected from a second group consisting of urea and amides having a formula R—CO—$NH_2$, in which R represents a hydrogen atom, an alkyl radical or a $CH_3$—CHOH radical; and ammonia; said element from said first group representing at least 5 molar percent of the active mixture, said element from said second group representing at least 5 molar percent of the active mixture, and the ammonia representing at most 80 molar percent of the active mixture.

3. A composition for attracting and retaining fish in an area of an aquatic medium, which comprises an active mixture comprising at least one active element selected from a first group consisting of monoalkylamines, dialkylamines, polyamines and their oxides; at least one active element selected from a second group consisting of amino acids, urea and amides having a formula R—CO—$NH_2$, in which R represents a hydrogen atom, an alkyl radical or a $CH_3$—CHOH radical; and at least one active element selected from a third group consisting of hydrochloric, hydrobromic, hydroiodic, sulphuric, phosphoric, formic, myristic, lactic, butyric, acetic and caproic acids; said element from said first group representing at least 5 molar percent of the active mixture, and said element from said second group representing at least 5 molar percent of the active mixture.

4. A composition for attracting and retaining fish in an area of an aquatic medium, which comprises an active mixture comprising at least one active element selected from a first group consisting of monoalkylamines, dialkylamines, trialkylamines, polyamines and their oxides; at least one active element selected from a second group consisting of amino acids, urea and amides having a formula R—CO—$NH_2$, in which R represents a hydrogen atom, an alkyl radical or a $CH_3$—CHOH radical; ammonia; and at least one active element selected from a third group consisting of hydrochloric, hydrobromic, hydroiodic, sulphuric, phosphoric, formic, myristic, lactic, butyric, acetic and caproic acids; said element from said first group representing at least 5 molar percent of the active mixture, said element from said second group representing at least 5 molar percent of the active mixture and the ammonia representing at most 80 molar percent of the active mixture.

5. A composition according to claim 4 wherein the element selected from the second group is an amino acid, and said amino acid is at least partly combined with the ammonia in the form of ammonium salt.

6. A composition according to claim 4, wherein the element selected from the third group is at least partly combined with the ammonia in the form of ammonium salt.

7. A composition according to claim 3 wherein the element selected from the third group is an acid selected from the group consisting of hydrochloric, hydrobromic, hydroiodic, sulfuric and phosphoric acid and said acid is at least partly combined with at least one amine from said first group in the form of hydrochloride, hydrobromide, hydroiodide, sulphate or phosphate of amine.

8. A composition according to claim 3 wherein the element selected from the third group is hydrochloric, hydrobromic, hydroiodic, sulfuric or phosphoric acid and is at least partly combined with at least one amino acid selected from said second group in the form of hydrochloride, hydrobromide, sulfate, or phosphate of amino acid.

9. A composition according to claim 1 or 3 wherein the element selected from the first group is an amine selected from the group consisting of monomethylamine, dimethylamine, hexamethylene diamine and hexamethylene tetramine.

10. A composition according to claim 2 or 4, wherein the element of the first group is triethylamine.

11. A composition according to claims 1, 2, 3 or 4, wherein the active element of the second group is urea.

12. A composition according to claim 3 or 4 wherein the element selected from the second group is an amino acid selected from the group consisting of lysine, glutamic acid, and arginine.

13. A composition according to claim 3 or 4 wherein the element selected from the third group is hydrochloric or lactic acid.

14. A process for attracting and retaining fish in an area of an aquatic medium, which comprises diffusing into said area a mixture which comprises at least one active element selected from a first group consisting of monoalkylamines, dialkylamines, polyamines and their oxides, and at least one active element selected from a second group consisting of urea and amides having a formula R—CO—NH$_2$, in which R represents a hydrogen atom, an alkyl radical or a CH$_3$—CHOH— radical, the active element from the first group and the active element from the second group being diffused into the aquatic medium in a proportion such that each element represents at least 5 molar percent of the total of the diffused mixture.

15. A process for attracting and retaining fish in an area of an aquatic medium, which comprises diffusing into said area a mixture which comprises at least one active element selected from a first group consisting of monoalkylamines, dialkylamines, trialkylamines, polyamines and their oxides; at least one active element selected from a second group consisting of urea and amides having a formula R—CO—NH$_2$, in which R represents a hydrogen atom, an alkyl radical or a CH$_3$—CHOH- radical; and ammonai; the active element from the first group and the active element from the second group being diffused into the aquatic medium in a proportion such that each element represents at least 5 molar percent of the total of the diffused mixture.

16. A process for attracting the retaining fish in an area of an aquatic medium, which comprises diffusing into said area a mixture which comprises at least one active element selected from a first group consisting of monoalkylamines, dialkylamines, polyamines and their oxides; at least one active element selected from a second group consisting of amino acids, urea and amides having a formula R—CO—NH$_2$, in which R represents a hydrogen atom, an alkyl radical or a CH$_3$—CHOH- radical; and at least one active element selected from a third group consisting of hydrochloric, hydrobromic, hydroiodic, sulphuric, phosphoric, formic, myristic, lactic, butyric, acetic and caproic acids; the active element from the first group and the active element from the second group being diffused into the aquatic medium in a proportion such that each element represents at least 5 molar percent of the total of the diffused mixture.

17. A process for attracting and retaining fish in an area of an aquatic medium, which comprises diffusing into said area at least one active element selected from a first group consisting of monoalkylamines, dialkylamines, trialkylamines, polyamines and their oxides; at least one active element selected from a second group consisting of amino acids, urea and amides having a formula R—CO—NH$_2$, in which R represents a hydrogen atom, an alkyl radical or a CH$_3$—CHOH- radical; ammonia; and at least one active element selected from a third group consisting of hydrochloric, hydrobromic, hydroiodic, sulphuric, phosphoric, formic, myristic, lactic, butyric, acetic and caproic acids; the active element from the first group and the active element from the second group being diffused into the aquatic medium in a proportion such that each element represents at least 5 molar percent of the total of the diffused mixture.

18. A process according to claim 17, wherein the element of the second group is an amino acid, and said amino acid is at least partly diffused in combination with the ammonia in the form of ammonium salt.

19. A process according to claim 16 or 17, wherein the element of the third group is at least partly diffused in combination with ammonia in the form of ammonium salt.

20. A process according to claim 16 or 17 wherein the element selected from the third group is an acid selected from the group consisting of hydrochloric, hydrobromic, hydroiodic, sulphuric and phosphoric acid, and said acid is at least partly diffused in combination with at least one amine from said first group in the form of hydrochloride, hydrobromide, hydroiodide, sulphate or phosphate of amine.

21. A process according to claim 14, 15, 16 or 17, wherein the active elements are fixed on adsorbing or absorbing supports, said supports having characteristics such that the active elements of the mixture are diffused from said supports into the aquatic medium at a diffusion rate such that the concentration of the active elements from the first group and the second group each represent at least 5 molar percent of the diffused mixture.

* * * * *